United States Patent [19]

Crudden et al.

[11] Patent Number: 4,827,248

[45] Date of Patent: May 2, 1989

[54] PROXIMITY SENSOR WITH AUTOMATIC GAP CONTROL

[75] Inventors: Eric H. Crudden, Mercer Island; John Kay, Kirkland, both of Wash.

[73] Assignee: The Boeing Company, Seattle, Wash.

[21] Appl. No.: 68,261

[22] Filed: Jun. 30, 1987

[51] Int. Cl.[4] .............................................. G08B 21/00
[52] U.S. Cl. ...................................... 340/686; 60/230; 244/110 B; 340/945; 340/687
[58] Field of Search ............... 340/945, 963, 686, 687; 73/178 R, 178 T; 244/53 R, 110 B; 60/230; 324/207, 208, 59, 262

[56] References Cited

U.S. PATENT DOCUMENTS

| Re. 28,590 | 10/1975 | Salmi ..................................... 280/477 |
|---|---|---|
| 2,819,359 | 1/1958 | Johnson ................................. 200/52 |
| 3,436,726 | 4/1969 | Dentz .................................... 340/52 |
| 3,454,869 | 7/1969 | Strauss et al. ......................... 323/75 |
| 3,479,057 | 11/1969 | Miller .................................... 340/687 |
| 3,514,627 | 5/1970 | Bridgeman .......................... 340/686 |
| 3,710,370 | 1/1973 | Quilici et al. . |
| 3,825,921 | 7/1974 | Marus et al. ......................... 340/686 |
| 3,876,977 | 4/1975 | Ladewig ............................... 340/135 |
| 4,058,792 | 11/1977 | Soltesz . |
| 4,127,856 | 11/1978 | Bickel ................................... 340/687 |
| 4,219,740 | 8/1980 | Little .................................... 340/686 |
| 4,424,669 | 1/1984 | Fage .................................... 244/110 B |
| 4,437,783 | 3/1984 | Halin et al. ......................... 244/110 B |
| 4,519,256 | 5/1985 | Daniels ................................. 73/745 |
| 4,522,358 | 6/1985 | Dinger et al. ...................... 244/110 B |

Primary Examiner—Joseph A. Orsino
Assistant Examiner—Brent A. Swarthout
Attorney, Agent, or Firm—Joan H. Paully

[57] ABSTRACT

A sensor (20) is mounted on a fixed torque box (8) carried by a fixed portion of an engine nacelle (6). A target plate (40) is resiliently mounted on a thrust reverser translating cowl (10). A cylindrical sleeve (32) is attached to the sensor (20) and surrounds its outer sensing end (22). The outer radial surface (34) of the sleeve (32) is spaced beyond the sensing end (22) a predetermined distance (100). The surface (34) contacts the target plate (40) when the cowl (10) is in its closed position. The resilient mounting of the plate (40) compensates for inaccuracies in the installation of the plate (40) and allows relative movement between the cowl (10) and the plate (40) when the cowl (10) is in its closed position to maintain a fixed gap (100) between the plate (40) and the sensor (20).

16 Claims, 4 Drawing Sheets

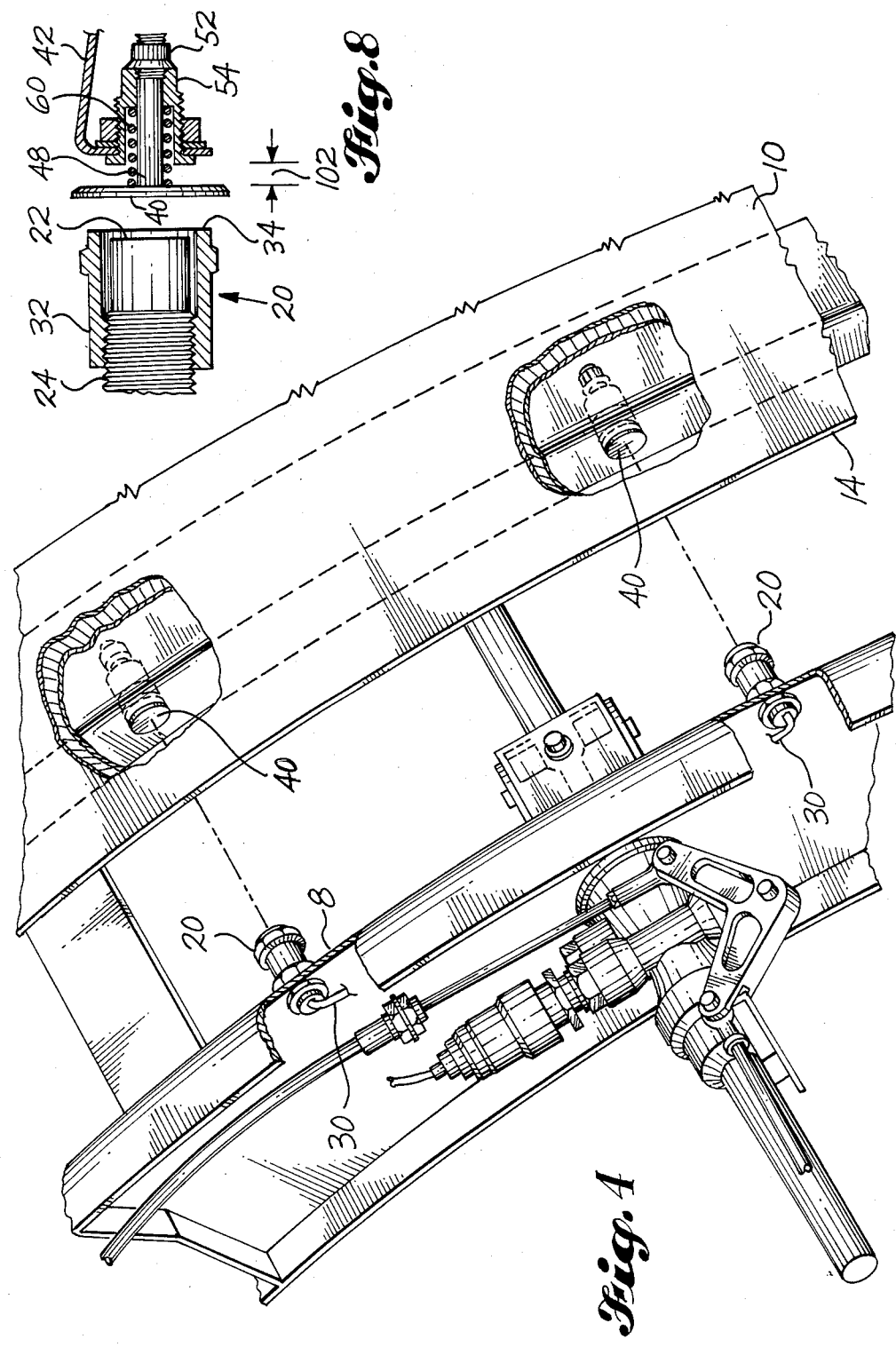

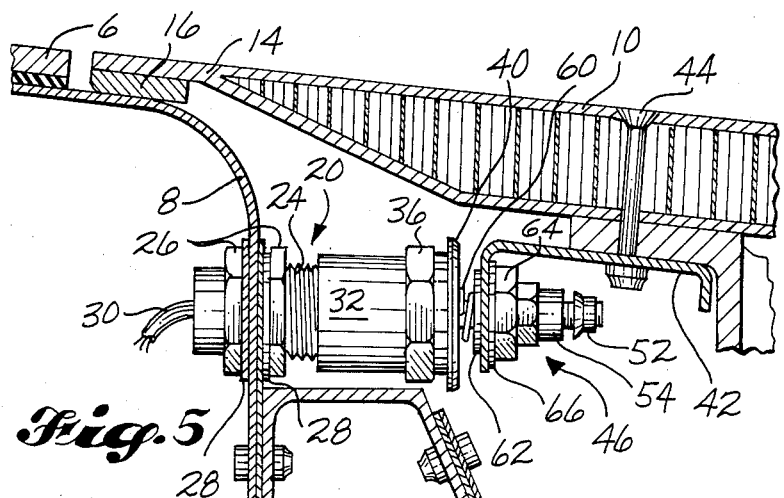
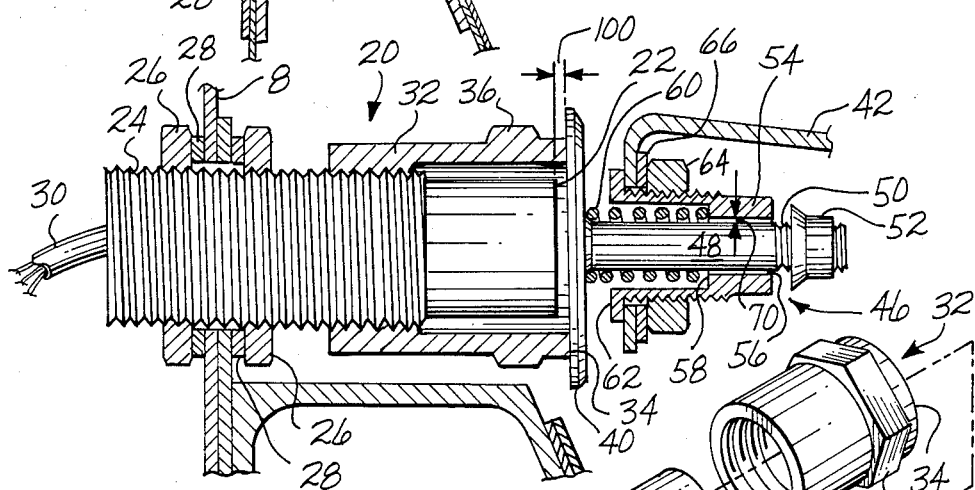
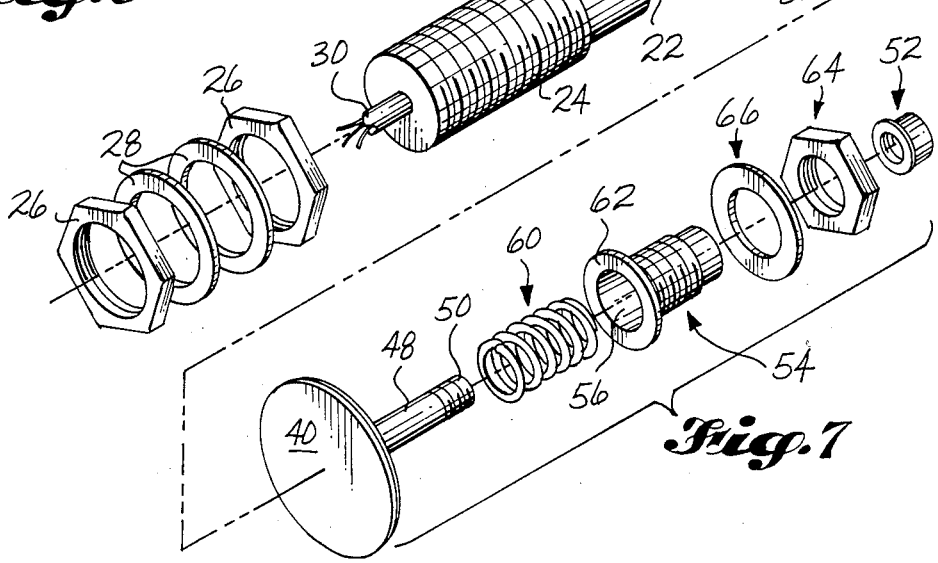

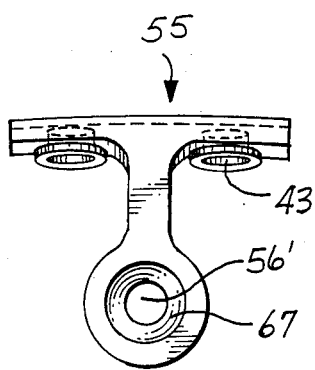
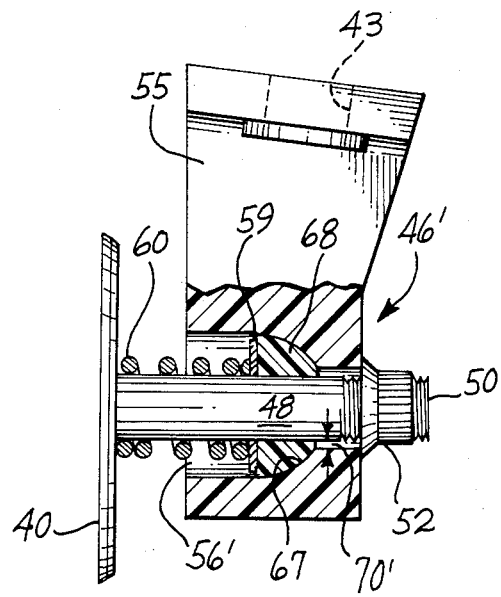
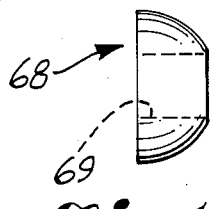
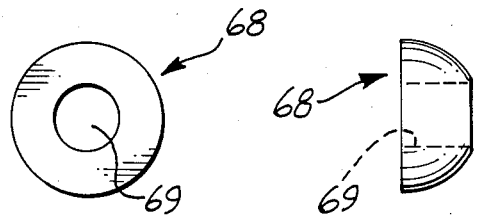

PROXIMITY SENSOR WITH AUTOMATIC GAP CONTROL

TECHNICAL FIELD

This invention relates to systems for indicating the proximity of two members and, more particularly, to such a system in which a sensor is mounted on one member and a target is resiliently mounted on the other member, and a constant gap is maintained between the sensor and the target by opposite abutting surfaces carried by the sensor and the target.

BACKGROUND ART

In the operation of aircraft, it is important that the crew be able to determine whether movable portions of the aircraft structure are in proper positions. For example, there is a need to verify that the translating thrust reverser cowls are in their proper lock positions when the thrust reversers are not in use. The required indication of the lock position is currently provided by a proximity sensor mounted on a fixed structure, such as the nacelle torque box. A target is fixedly mounted on the translating cowl opposite the sensor. The sensor generates a signal when the target is within a predetermined distance of the sensor. An electrical circuit transmits the signal and converts it into a visual indication in the cockpit that the cowl is in a locked position.

A number of problems have been encountered in connection with the use of known sensor arrangements in lock indicating systems for thrust reverser translating cowls. The sensors are designed to be always separated from the target by a gap. A correct gap dimension when the cowl is in its lock position is critical to the proper functioning of the indicating system. A gap that is too large results in a false indication that the cowl is not in a lock position. Such false indications in turn cause expensive and unnecessary flight delays. A gap that is too small can result in undesirable contact between the delicate sensor and the target and even damage to the sensor when it is impacted by the target.

In current systems, the sensor is mounted in a fixed position on a fixed structure and then the target is mounted on the cowl. The mounting of the target is adjustable to preset the critical gap dimension. The presetting of the gap dimension is difficult and tedious in installations such as the thrust reverser translating cowl on the Boeing 737-300 aircraft. The adjustment has to be made blind because the sensor is mounted on the edge of the fixed structure, and the end of the cowl forms a flange which overlaps the fixed structure. Thus, when the cowl is in its lock position, the sensor and target are not accessible from either the inside or the outside. Therefore, adjustment of the gap has to be accomplished by a trial and error method. One such method is to place putty between the sensor and the target, close the cowl, open the cowl, measure the thickness of the putty compressed between the sensor and the target, and make any required adjustments by shimming the target. Another method is to use the visual indicator of the lock indicating system to determine when the gap has been adjusted to its desired dimension. Such trial and error methods of adjusting the target position are time consuming and therefore expensive and do not have a high degree of accuracy. In addition, the arrangement of a fixed preset target position does not have any means for compensating for minor differences in the position of the cowl when it is in its lock position. These factors can combine to produce false open indications or damage to the sensor under flight conditions.

Th patent literature includes a variety of examples of systems for indicating the relative position of a structure. U.S. Pat. No. 2,819,359, granted Jan. 7, 1958, to J. P. Johnson, discloses a warning device for indicating relative movement between two adjacent structures. A cylindrical housing is mounted on one of the structures, and a rod is mounted on the other structure. When relative lateral or longitudinal movement between the structures exceeds a safe limit, the end of the rod which projects into the open end of the housing contacts the inner surface of the housing sidewall. This closes a circuit to set off an alarm. A cylindrical rubber "boot" or sleeve surrounds the rod and sealingly engages the outside of the housing to keep moisture, dirt, etc. out of the assembly.

U.S. Pat. No. 3,436,726, granted Apr. 1, 1969, to A. O. Dentz, discloses a warning device to indicate that a vehicle hood is not fully closed. In one embodiment, a plunger mounted on the vehicle contacts the hood. The plunger extends when the hood opens to close a circuit and set off an alarm. In another embodiment, a disk is slidably mounted in a cylinder attached to the hood. When the hood opens, a safety latch hook carried by the vehicle contacts the disk and slides it down into the cylinder to move two contacts together and complete an electrical circuit.

U.S. Pat. No. 3,454,869, granted July 8, 1969, to B. Strauss et al., discloses a proximity sensing system for use in an aircraft environment. The system is responsive to changes in inductance caused by changes in the separation between a sensor and a positionable target. Strauss et al. state that it is desirable to have a relatively large gap between the sensor and the target.

U.S. Pat. No. 3,710,370, granted Jan. 9, 1973, to A. P. Quilici, discloses a warning system for indicating improper coupling of a trailer hitch to an automobile. A top portion of the coupler ball carried by the automobile is spring biased away from the main body portion of the ball. When the ball socket hitch member is properly coupled to the ball, the socket moves the top portion of the ball toward the main body against the action of the spring to close the circuit and de-energize an alarm.

U.S. Pat. No. 4,058,792, granted Nov. 15, 1977, to J. A. Soltesz, discloses a system for detecting changes in the orientation of a floating structure, such as a boat. The system includes a submersible sensor having two weighted portions. Each of the portions carries a switch, and the two switches are normally in contact with each other. A change in orientation causes separation of the switches.

U.S. Pat. No. 3,876,977, granted Apr. 8, 1975, to W. Ladewig, discloses a proximity switch for an automobile horn. U.S. Pat. No. Re. 28,590, reissued on Oct. 28, 1975, to M. I. Salmi, discloses an indicating apparatus for use in coupling a trailer to a vehicle The apparatus senses and indicates deflection of a guide line and the distance between the trailer and the vehicle. U.S. Pat. No. 4,127,856, granted Nov. 28, 1978, to G. G. Bickel, discloses a latch on a loading dock to engage a rod carried by a truck. The latch has indicator switches that are activated by arms of the locking mechanism contacting buttons on the switches.

The above patents and the prior art discussed and/or cited therein should be carefully considered for the purpose of putting the present invention into proper perspective relative to the prior art.

DISCLOSURE OF THE INVENTION

A subject of the invention is an improvement in a system which has a proximity sensor component positioned on a first member and a target component positioned on a second member, in which the members are moved together and apart, and in which the proximity sensor component has a sensing end and generates a signal in response to a distance between the sensing end and the target component. According to an aspect of the invention, the improvement comprises first and second abutment surface means carried by the sensor component and the target component, respectively. A spring mount is provided for one of the components and biases such component toward the other component. The sensor component, target component, and first and second abutment surface means are positioned such that, when the first and second members move together, the first and second abutment surface means contact each other to maintain a predetermined distance between the sensing end of the sensor component and the target component.

According to another aspect of the invention, a sleeve is secured to the sensor component and surrounds an outer portion of the sensor component including the sensing end. The first abutment surface means is formed by an outer radial surface of the sleeve spaced beyond the sensing end said predetermined distance. The target component comprises a target plate having an outer face which forms the second abutment surface means and contacts the outer radial surface of the sleeve when the two members move together. Preferably, the target plate is mounted on the second member by the spring mount, and the spring mount biases the target plate toward the sensor component and the outer radial surface of the sleeve.

A feature of the invention is a spring mount which exerts a biasing force on said one of said components of sufficient magnitude, and allows sufficient movement of said one of said components relative to the member on which it is positioned, to maintain contact between the first and second abutment surface means when the positions of the first and second members relative to each other are within a predetermined range. This feature of the invention serves to make the installation of the target component easier since the spring mount will automatically compensate for minor inaccuracies in the mounting. The feature also automatically compensates for minor movement of the two members relative to each other which is within tolerance limits, and prevents such minor movement from resulting in a false signal indicating significant relative movement of the members.

Another subject of the invention is an improvement in the type of system described above in which the sensor component and the target component are enclosed by the first and second members and are inaccessible when the first and second members move together. According to an aspect of the invention, the improvement comprises first and second abutment surface means and a spring mount as described above, and the sensor component, target component, and first and second abutment surface means are positioned as described above. The spring mount exerts a biasing force and allows movement, also as described above. The abutment surface means are preferably formed by a sleeve and target plate in the above-described manner. According to another aspect of the invention, one of the first and second members is a fixed portion of an aircraft engine nacelle, and the other of the first and second members is a thrust reverser translating cowl.

The improvement of the invention has a number of advantages. The structure of the elements of the improvement is relatively simple, and easy and inexpensive to manufacture, install, and maintain. The contact between the abutment surface means ensures that there is always at least a minimum predetermined distance between the sensor component and the target component to in turn ensure that the sensor component is not damaged by contact with the target component. The combination of the first and second abutment surface means and the spring mount facilitates installation of the target component and helps ensure that, in use, the system will give consistent and reliable indications of the relative positions of the two members. The improvement of the invention solves the problems discussed above by making quick and easy installation possible and, at the same time, providing more accurate gap dimensioning and system reliability than has been possible in previous known sensor arrangements.

These and other advantages and features will become apparent from the detailed description of the best modes for carrying out the invention that follows.

BRIEF DESCRIPTION OF THE DRAWINGS

In the drawings, like element designations refer to like parts throughout, and

FIG. 4 is a fragmentary pictorial view of edge portions of the thrust reverser torque box and translating cowl of the installation shown in FIGS. 1 and 2 with the preferred embodiment of the sensor/target arrangement of the invention installed thereon and with foreground portions cut away.

FIG. 5 is like the solid line portion of FIG. 3 except that it shows the preferred embodiment of the invention.

FIG. 6 is an enlarged view of a portion of FIG. 5 including the sensor and target and their mounts, with additional parts shown in section to reveal more detail of the structure.

FIG. 7 is an exploded pictorial view of the preferred embodiment of the invention.

FIG. 8 is similar to FIG. 6 except that the left-hand portion has been cut away and the target is shown moved away from the sensor sleeve.

FIG. 9 is a sectional view of the target and a second preferred embodiment of the spring mount, with parts shown in elevation.

FIG. 10 is a front elevational view of the mounting member shown in FIG. 9.

FIG. 11 is a side elevational view of the hemispherical bearing member, shown in FIGS. 9 and 10.

FIG. 12 is a front elevational view of the bearing member shown in FIGS. 9-11.

BEST MODES FOR CARRYING OUT THE INVENTION

The drawings show apparatus that is constructed according to the invention and that also constitutes the best modes of the invention currently known to the applicants. The drawings illustrate the use of the invention in connection with a thrust reverser translating cowl. It is anticipated that the primary use for the apparatus of the invention will be in installations such as that shown in FIGS. 1 and 2. However, it is of course to be understood that the apparatus of the invention may also be used to advantage in connection with other types of structures in aircraft and other environments.

Figure 1:
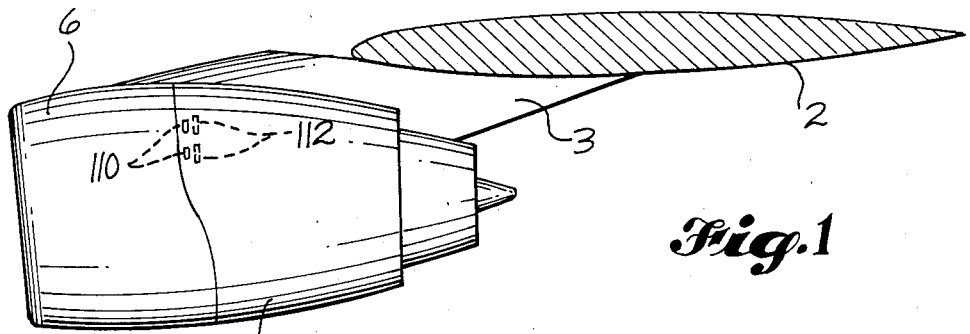
FIG. 1 is an elevational view of a wing mounted aircraft engine illustrating typical sensor locations for a thrust reverser translating cowl, with the wing shown in section.
Figure 2:
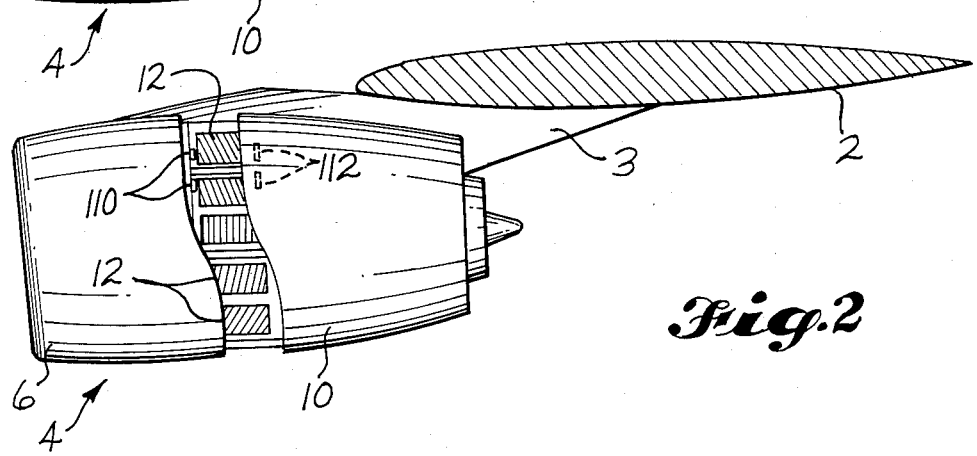
FIG. 2 is like FIG. 1 except that it shows the cowl in an open position.

FIGS. 1 and 2 show an aircraft engine 4 mounted on a wing 2 by a strut 3. The engine 4 is surrounded by a nacelle having a fixed portion 6 to which a thrust reverser translating cowl 10 is attached. In its closed position shown in FIG. 1, the cowl 10 encloses thrust reversers 12. The cowl 10 is maintained in this position during most flight conditions. When the thrust reversers 12 are to be used, the cowl 10 is translated rearwardly into the open position shown in FIG. 2. FIGS. 1 and 2 illustrate schematically sensor locations 110 and target locations 112 of a lock indicating system which allows the crew to determine if the cowl 10 is in its lock position shown in FIG. 1.

Figure 3:
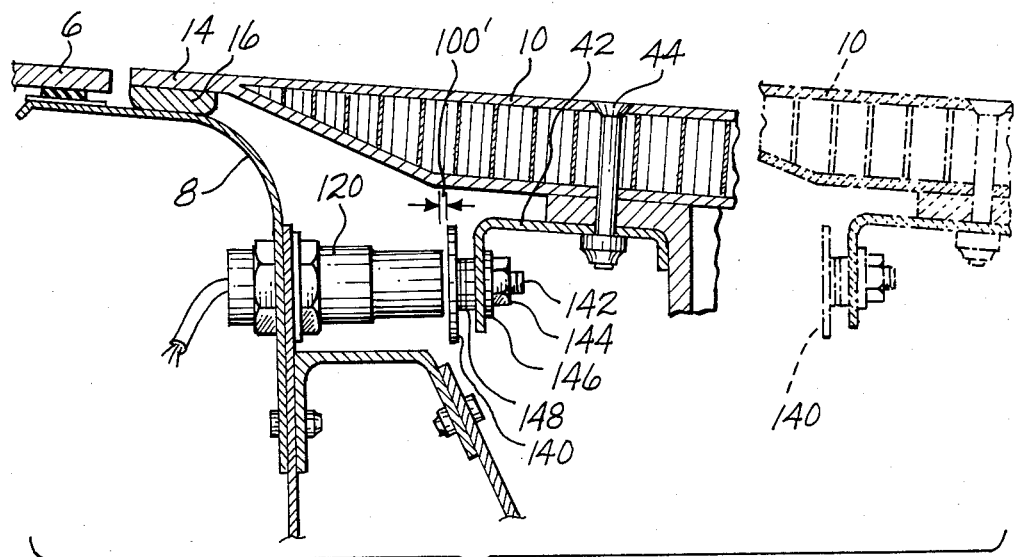
FIG. 3 is a fragmentary sectional view of edge portions of the fixed nacelle portion and cowl shown in FIGS. 1 and 2 including a known sensor/target arrangement, with the closed position, of the cowl shown in solid lines and the open position shown in broken lines and with parts shown in elevation

FIG. 3 shows a known sensor/target arrangement and illustrates the problems discussed above. A sensor 120 of a known type is mounted on a torque box 8 which is carried by the fixed nacelle portion 6. A target plate 140 is mounted on the cowl 10 in a known manner. The outer end of the cowl 10 forms a flange 14 which carries an annular closure member 16. The closure member 16 engages the outer circumferential surface of the torque box 8 that extends beyond the outer wall of the nacelle portion 6. This arrangement results in maximizing the aerodynamic characteristics of the junction between the nacelle portion 6 and the cowl 10 but also results in the problems relating to the lock indication system discussed above. The sensor 120 and target plate 140 are fully enclosed when the cowl 10 is in its lock position shown in FIG. 1 and in solid lines in FIG. 3. Thus, there is no access to the target mount to adjust the position of the target plate 140.

As discussed above, the position of the target plate 140 has previously been adjusted by a trial and error method using shims 148. A threaded stem 142 extends from the target plate 140 and through a bracket 42. A nut 144 and washer 146 secure the outer end of the stem to the bracket 42. The shims 148 adjust the position of the target plate 140 by increasing or decreasing the distance between the plate 140 and the side of the bracket 42 opposite the nut 144 and washer 146. The adjustment of the position of the target plate 140 adjusts the dimension of the gap 100' between the sensor 120 and the target plate 140 when the cowl 10 is in its closed lock position.

A first preferred embodiment of the apparatus of the invention is shown in FIGS. 4-8. The apparatus includes a sensor 20 and a target plate 40. FIG. 4 illustrates the mounting locations of the sensor 20 and the target plate 40. Referring to FIGS. 5-7, the sensor 20 has a substantially cylindrical body with an outer radial sensing end 22 and circumferential threads 24 on the end portion opposite the sensing end 22. Nuts 26 and washers 28 engage the threads 24 to secure the sensor 20 to the torque box 8. The sensor 20 is electrically connected to remote portions of the lock indicating system by a wire bundle 30 which extends axially outwardly from the end of the sensor 20 opposite the sensing end 22. The sensor 20 may be of a known type, such as the type manufactured by Eldec Corp. of Lynnwood, Washington, with modifications to the housing to accommodate the sleeve 32 described below.

Still referring to FIGS. 5-8, the target plate 40 is resiliently mounted on a bracket 42 which is in turn secured to the cowl 10 by fasteners 44. A shaft 48 is secured to and extends axially outwardly from the face of the plate 40 opposite the sensor 20. The outer end 50 of the shaft 48 is threaded for receiving an adjusting nut 52. The preferred material for forming the target plate 40 is corrosion resistant steel.

The spring mount 46 for the target plate 40 includes a generally hat-shaped housing 54 having a radial mounting flange 62 on one end. An axial opening 56 extends through the housing 54 and has an enlarged diameter portion which extends from about the axial middle of the housing 54 outwardly through the flange 62. The inner end of the enlarged diameter portion forms a shoulder 58. The outer circumferential surface of the housing 54 adjacent to the flange 62 is threaded. A nut 64 and washer 66 secure the housing 54 to the bracket 42, which is received between the washer 66 and the flange 62.

The shaft 48 extends through the axial opening 56 in the housing 54 with the outer threaded end 50 projecting therefrom. The shoulder 58 forms a spring abutment for one end of a coil spring 60 which surrounds the shaft 48. The other end of the spring 60 abuts the face of the target plate 40 to which the shaft 48 is attached. The spring 60 biases the target plate 40 toward the sensor 20. The adjusting nut 52 may be turned to adjust the biasing force of the spring 60 and the position of the target plate 40 when the target plate 40 is out of contact with an abutment surface 34 carried by the sensor 20, as shown in FIG. 8.

The apparatus of the invention includes first and second abutment surface means carried by the sensor 20 and the target plate 40, respectively. In the preferred embodiment shown in FIGS. 4-8, the first abutment surface means is formed by a cylindrical sleeve 32 which has internal threads for securing it to the threads 24 of the sensor body 20. The outer radial surface 34 of the sleeve 32 facing the target plate 40 forms the first abutment surface means. Wrench flats 36 are provided on the sleeve 32 for installing and adjusting the sleeve. The sleeve 32 surrounds the outer portion of the sensor body 20 including the radial sensing end 22. The abutting surface 34 is spaced beyond the sensing end 22 a predetermined distance 100 to define a predetermined gap between the sensing end 22 and the target plate 40 when the cowl 10 is in its lock position. See FIG. 6. The sleeve 32 is preferably made from nonconductive plastic so that it will not influence the electrical characteristics of the sensor 20. The outer face of the target plate 40 facing the sensor 20 forms the second abutment surface means.

The preferred arrangement shown in the drawings and described above may be modified without departing from the spirit and scope of the invention. For example, the sleeve 32 could be secured to the target plate 40 rather than to the sensor body 20. In such case, the outer end of the sleeve would abut a radial surface of a flange carried by the target body 20. This arrangement is within the scope of the invention, but the arrangement shown in the drawings is preferred. In the arrangement shown in the drawings, the sleeve 32 permanently surrounds the sensor body 20 and has a fixed radial position relative to the sensor 20. Therefore, unintended contact between the outer end of the sensor 20 and the sleeve 32 due to radial misalignment between the sensor 20 and the target plate 40 is prevented. Another example of a possible modification is the mounting of the sensor 20, rather than the target plate 40, on a spring mount. This alternative arrangement would not be preferred in most installations since it might complicate the electrical connections to the sensor 20.

The spring mount 46 allows movement of the target plate 40 relative to the cowl 10. The biasing force of the spring 60 is of a sufficient magnitude, and the spring mount 46 allows sufficient relative movement of the target plate 40, to maintain contact between the abutment end 34 of the sleeve 32 and the face of the target plate 40 when the positions of the fixed nacelle portion 6 and cowl 10 relative to each other are within a predetermined range. Preferably, the spring 60 is preloaded to exert a force of about four pounds in the position shown in FIG. 8. The predetermined range encompasses normal flexing and minor relative movement of the nacelle portion 6 and the cowl 10 when the cowl 10 is in its lock position. The magnitude of the predetermined range of axial movement is equal to the magnitude of relative axial movement of the target plate 40 allowed by the spring mount 46, which is indicated by the reference numeral 102 in FIG. 8. During the installation procedure, the position of the target plate 40 is adjusted so that the plate 40 will normally be in a middle portion of its range of axial movement when the cowl 10 is in its closed position, as shown in FIGS. 5 and 6. This allows for relative movement of the fixed nacelle portion 6 and cowl 10 in either axial direction and compensates for adjusting errors in either direction. The design of the spring mount 46 and the installation procedure ensure that positive contact between the sleeve end 34 and the target plate 40 is maintained when the cowl 10 is in its closed position. The combination of the positive contact and the fixed gap provided by the positioning of the sleeve 32 helps ensure accuracy and reliability of the indication system during normal flight conditions and when the actuation system is unpressurized.

The spring mounting of the target plate 40 preferably allows angular as well as axial movement of the target plate 40 relative to the cowl 10 to compensate for slight angular misalignments of the fixed nacelle portion 6 and the cowl 10 and to ensure that the outer face of the target plate 40 squarely abuts the sleeve surface 34. In the embodiment shown in FIGS. 4-8, the clearance 70 (see FIG. 6) between the shaft 48 and the housing 54 permits some angular movement of the shaft 48 and the attached target plate 40 to provide some angular compensation. A greater amount of angular compensation is provided by the second preferred embodiment of the spring mount 46' shown in FIGS. 9-12.

In the embodiment of FIGS. 9-12, the bracket 42 and the housing 54 are replaced by a single mounting member 55. The mounting member 55 has fastener holes 43 for attaching it to the cowl 10. The member 55 has an axial opening 56' extending therethrough for receiving the shaft 48. As in the first embodiment, the projecting outer threaded end 50 of the shaft 48 receives an adjusting nut 52. The end of the axial opening 56' opposite the target plate 40 has a diameter which is sufficiently large to provide a clearance 70' between the shaft 48 and the sidewall of the opening 56'. The portion of the opening 56' adjacent to the target plate 40 has an enlarged diameter and terminates at its inner end in a hemispherical bearing surface 67. A hemispherical bearing member 68 is received into the opening 56' and is slidable along the bearing surface 67. The shaft 48 extends through an axial opening 69 in the bearing member 68. The combination of the clearance 70' and the slidability of the bearing member 68 along bearing surface 67 allows angular movement of the target plate 40 relative to the cowl 10 to provide the desired compensation for angular misalignment and square abutment of the target plate 40 against the sleeve surface 34. Since the mounting member 55 is preferably made from a molded plastic material, a stainless steel washer 59 is positioned adjacent to the outer radial face of the bearing member 68 to provide an abutment for the spring 60.

The second preferred embodiment of the spring mount 46' in FIGS. 9-12 is preferred over the embodiment shown in FIGS. 4-8 for installation in new aircraft. The second embodiment provides a greater degree of compensation for angular misalignment. In addition, the mounting member 55 and the bearing member 68 may be readily manufactured from a molded plastic to decrease the cost of manufacture and the weight of the spring mount 46'. The first preferred embodiment shown in FIGS. 4-8 has the advantage of more readily lending itself to retrofitting existing aircraft.

It will be obvious to those skilled in the art to which this invention is addressed that the invention may be used to advantage in a variety of situations. Therefore, it is also to be understood by those skilled in the art that various modifications and omissions in form and detail may be made without departing from the spirit and scope of the invention as defined by the following claims.

What is claimed is:

1. In a system comprising a proximity sensor component positioned on a first member and a target component positioned on a second member, in which said members are moved together and apart, and in which said proximity sensor component has a sensing end and generates a signal in response to a distance between said sensing end and said target component, an improvement comprising:

first and second abutment surface means carried by said sensor component and said target component, respectively; and a spring mount for mounting one of said components on the member on which it is positioned, biasing said one of said components toward the other of said components;

said sensor component, said target component, and said first and second abutment surface means being positioned such that, when said first and second members move together, said first and second abutment surface means contact each other to maintain a predetermined distance between said sensing end of said sensor component and said target component.

2. The system of claim 1, which comprises a sleeve secured to the sensor component and surrounding an outer portion of the sensor component including said sensing end, in which said first abutment surface means is formed by an outer radial surface of the sleeve spaced beyond said sensing end said predetermined distance, and in which the target component comprises a target plate having an outer face which forms said second abutment surface means and contacts said outer radial surface of the sleeve when the two members move together.

3. In a system comprising a proximity sensor component positioned on a first member and a target component positioned on a second member, in which said members are moved together and apart, and in which said proximity sensor component has a sensing end and generates a signal in response to a distance between said sensing end and said target component, an improvement comprising:

first and second abutment surface means carried by said sensor component and said target component, respectively; and a spring mount for one of said components, biasing said one of said components toward the other of said components;

said sensor component, said target component, and said first and second abutment surface means being positioned such that, when said first and second members move together, said first and second abutment surface means contact each other to maintain a predetermined distance between said sensing end of said sensor component and said target component;

said system comprising a sleeve secured to the sensor component and surrounding an outer portion of the sensor component including said sensing end, said first abutment surface means being formed by an outer radial surface of the sleeve spaced beyond said sensing end said predetermined distance, and said target component comprising a target plate having an outer face which forms said second abutment surface means and contacts said outer radial surface of the sleeve when the two members move together; and said target plate being mounted on the second member by the spring mount, and said spring mount biasing the target plate toward the sensor component and said outer radial surface of the sleeve.

4. The system of claim 1, in which the spring mount exerts a biasing force on said one of said components of sufficient magnitude, and allows sufficient movement of said one of said components relative to the member on which it is positioned, to maintain contact between said first and second abutment surface means when the positions of the first and second members relative to each other are within a predetermined range.

5. In a system comprising a proximity sensor component positioned on a first member and a target component positioned on a second member, in which said members are moved together and apart, in which said proximity sensor component has a sensing end and generates a signal in response to a distance between said sensing end and said target component, and in which said sensor component and said target component are enclosed by said first and second members and are inaccessible when said first and second members move together, an improvement comprising:

first and second abutment surface means carried by said sensor component and said target component, respectively; and a spring mount for mounting one of said components on the member on which it is positioned, biasing said one of said components toward the other of said components;

said sensor component, said target component, and said first and second abutment surface means being positioned such that, when said first and second members move together, said first and second abutment surface means contact each other to maintain a predetermined distance between said sensing end of said sensor component and said target component; and said spring mount exerting a biasing force on said one of said components of sufficient magnitude, and allowing sufficient movement of said one of said components relative to the member on which it is positioned, to maintain contact between said first and second abutment surface means when the positions of the first and second members relative to each other are within a predetermined range.

6. The system of claim 5, in which one of said first and second members is a fixed portion of an aircraft engine nacelle, and the other of said first and second members is a thrust reverser translating cowl.

7. The system of claim 5, which comprises a sleeve secured to the sensor component and surrounding an outer portion of the sensor component including said sensing end, in which said first abutment surface means is formed by an outer radial surface of the sleeve spaced beyond said sensing end said predetermined distance, and in which the target component comprises a target plate having an outer face which forms said second abutment surface means and contacts said outer radial surface of the sleeve when the two members move together.

8. In a system comprising a proximity sensor component positioned on a first member and a target component positioned on a second member, in which said members are moved together and apart, in which said proximity sensor component has a sensing end and generates a signal in response to a distance between said sensing end and said component, and in which said sensor component and said target component are enclosed by said first and second members and are inaccessible when said first and second members move together, an improvement comprising:

first and second abutment surface means carried by said sensor component and said target component, respectively; and a spring mount for one of said components, biasing said one of said components toward the other of said components;

said sensor component, said target component, and said first and second abutment surface means being positioned such that, when said first and second members move together, said first and second abutment surface means contact each other to maintain a predetermined distance between said sensing end of said sensor component and said target component; and said spring mount exerting a biasing force on said one of said components of sufficient magnitude, and allowing sufficient movement of said one of said components relative to the member on which it is positioned, to maintain contact between said first and second abutment surface means when the positions of the first and second members relative to each other are within a predetermined range;

said system comprising a sleeve secured to the sensor component and surrounding an outer portion of the sensor component including said sensing end, said first abutment surface means being formed by an outer radial surface of the sleeve spaced beyond said sensing end said predetermined distance, and said target component comprising a target plate having an outer face which forms said second abutment surface means and contacts said outer radial surface of the sleeve when the two members move together; and said target plate being mounted on the second member by the spring mount, and said spring mount biasing the target plate toward the sensor component and said outer radial surface of the sleeve.

9. The system of claim 6, which comprises a sleeve secured to the sensor component and surrounding an outer portion of the sensor component including said sensing end, in which said first abutment surface means is formed by an outer radial surface of the sleeve spaced beyond said sensing end said predetermined distance, and in which the target component comprises a target plate having an outer face which forms said second abutment surface means and contacts said outer radial surface of the sleeve when the two members move together.

10. In a system comprising a proximity sensor component positioned on a first member and a target component positioned on a second member, in which said members are moved together and apart, in which said proximity sensor component has a sensing end and generates a signal in response to a distance between said sensing end and said target component, and in which said sensor component and said target component are enclosed by said first and second members and are inaccessible when said first and second members move together, an improvement comprising:

first and second abutment surface means carried by said sensor component and said target component, respectively; and a spring mount for one of said components, biasing said one of said components toward the other of said components;

said sensor component, said target component, and said first and second abutment surface means being positioned such that, when said first and second members move together, said first and second abutment surface means contact each other to maintain a predetermined distance between said sensing end of said sensor component and said target component; and said spring mount exerting a biasing force on said one of said components of sufficient magnitude, and allowing sufficient movement of said one of said components relative to the member on which it is positioned, to maintain contact between said first and second abutment surface means when the positions of the first and second members relative to each other are within a predetermined range;

one of said first and second members being a fixed portion of an aircraft engine nacelle, and the other of said first and second members being a thrust reverser translating cowl;

said system comprising a sleeve secured to the sensor component and surrounding an outer portion of the sensor component including said sensing end, said first abutment surface means being formed by an outer radial surface of the sleeve spaced beyond said sensing end said predetermined distance, and said target component comprising a target plate having an outer face which forms said second abutment surface means and contacts said outer radial surface of the sleeve when the two members move together; and said target plate being mounted on the second member by the spring mount, and said spring mount biasing the target plate toward the sensor component and said outer radial surface of the sleeve.

11. The system of claim 2, in which the spring mount includes means for allowing angular movement of said one of said components relative to the member on which it is positioned to compensate for angular misalignments of the first and second members and to help ensure squarely abutting contact between said outer face and said outer radial surface.

12. The system of claim 4, in which the spring mount includes means for allowing angular movement of said one of said components relative to the member on which it is positioned to compensate for angular misalignments of the first and second members and to help ensure squarely abutting contact between said first and second abutment surface means.

13. The system of claim 5, in which the spring mount includes means for allowing angular movement of said one of said components relative to the member on which it is positioned to compensate for angular misalignments of the first and second members and to help ensure squarely abutting contact between said first and second abutment surface means.

14. The system of claim 6, in which the spring mount includes means for allowing angular movement of said one of said components relative to the member on which it is positioned to compensate for angular misalignments of said fixed portion of said nacelle and the cowl and to help ensure squarely abutting contact between said first and second abutment surface means.

15. The system of claim 7, in which the spring mount includes means for allowing angular movement of said one of said components relative to the member on which it is positioned to compensate for angular misalignments of the first and second members and to help ensure squarely abutting contact between said outer face and said outer radial surface.

16. The system of claim 9, in which the spring mount includes means for allowing angular movement of said one of said components relative to the member on which it is positioned to compensate for angular misalignments of said fixed portion of said nacelle and the cowl and to help ensure squarely abutting contact between said outer face and said outer radial surface.

* * * * *

UNITED STATES PATENT AND TRADEMARK OFFICE
CERTIFICATE OF CORRECTION

PATENT NO. : 4,827,248

DATED : May 2, 1989

INVENTOR(S) : Eric H. Crudden and John Kay

It is certified that error appears in the above-identified patent and that said Letters Patent is hereby corrected as shown below:

Col. 2, line 4, "Th" should be -- The --.

Col. 4, line 41, there is no comma after "position".

Claim 4, col. 9, line 45, "Claim I" should be -- Claim 1 --.

Claim 8, col. 10, line 40, after "said", first occurrence, insert -- target --.

Signed and Sealed this

Fifteenth Day of May, 1990

Attest:

HARRY F. MANBECK, JR.

Attesting Officer

Commissioner of Patents and Trademarks